(12) United States Patent
Holtz

(10) Patent No.: US 6,605,244 B1
(45) Date of Patent: Aug. 12, 2003

(54) HEMATITE ENGRAVING

(76) Inventor: Kristy J. Holtz, 658 Silver Maple Dr., Fenton, MO (US) 63026

( * ) Notice: Subject to any disclaimer, the term of this patent is extended or adjusted under 35 U.S.C. 154(b) by 0 days.

(21) Appl. No.: 10/090,357

(22) Filed: Mar. 4, 2002

(51) Int. Cl.⁷ .............................................. B23K 26/40
(52) U.S. Cl. ................. 264/400; 264/482; 219/121.68; 219/121.69
(58) Field of Search ................................ 264/400, 482; 219/121.68, 121.69

(56) References Cited

U.S. PATENT DOCUMENTS

| | | | |
|---|---|---|---|
| 4,401,876 A | * 8/1983 | Cooper | ................... 219/121.69 |
| 4,467,172 A | 8/1984 | Ehrenwald et al. | |
| 5,149,938 A | * 9/1992 | Winston et al. | ........ 219/121.69 |
| 5,554,335 A | * 9/1996 | Fields et al. | ................. 264/400 |
| 6,211,484 B1 | 4/2001 | Kaplan et al. | |
| 6,238,847 B1 | 5/2001 | Axtell, III et al. | |

* cited by examiner

*Primary Examiner*—Stefan Staicovici
(74) *Attorney, Agent, or Firm*—Polster, Lieder, Woodruff & Lucchesi, L.C.

(57) ABSTRACT

In a process of engraving a bead of hematite ($Fe_2O_3$) in the form of specularite, a crystalline form with bright metallic luster, a pulsed laser beam is focused on the bead. The beam has a width of 0.005 to 0.006 inches, a wavelength of about 1064 nm and an intensity of 60 to 90 watts of power. The pulse rate is on the order of 2000 per second. The beam is moved in a controlled pattern to produce the desired engraving. Preferably the beam is moved at about 1.0 to 1.5 inches per second.

4 Claims, No Drawings

HEMATITE ENGRAVING

CROSS REFERENCE TO RELATED APPLICATIONS

STATEMENT REGARDING FEDERALLY SPONSORED RESEARCH OR DEVELOPMENT

Not Applicable

BACKGROUND OF THE INVENTION

Specular hematite (specularite) is a gray to black, shiny material that is popular, in the form of beads, as bracelets or necklaces. It is desirable to engrave beads to enhance their value. However, hematite poses peculiar problems. It is hard and tends to fracture. For this reason, techniques known heretofore for engraving diamonds, (see for example U.S. Pat. Nos. 6,211,484 and 4,467,172) are not immediately applicable to engraving of specular hematite. At the same time, components of the diamond engraving apparatus described in Pat. No. 6,211,484 and 4,467,172 are common to the apparatus used in the practice of the present invention, with the changes indicated in the following description of the preferred embodiment. It has been proposed to fuse to a substrate by laser a portion of a layer of powdered (iron brown) hematite (see U.S. Pat. No. 6,238, 847), but that is quite a different matter from engraving specular hematite.

BRIEF SUMMARY OF THE INVENTION

In accordance with this invention, generally stated, a method of engraving a specularite bead is provided comprising focusing on the bead a pulsed laser beam with a beam width of 0.005 to 0.006 inches, a wave length of about 1064 nm at an intensity of 60 to 90 watts of power, and a pulse rage on the order of 2000 per second, and moving the beam in a controlled pattern, preferably at about 1.0 to 1.5 inches per second.

DETAILED DESCRIPTION OF INVENTION

The following detailed description illustrates the invention by way of example and not by way of limitation. The mechanics of the method of this invention are illustrated in the various patents to which reference has been made above, and the teachings of which are incorporated by reference, so it is not thought necessary to illustrate them here, in view of the description of the preferred embodiment that follows.

Preferably a Q-switched Nd:YAG laser producing a wave length of 1064 nm is used, with an intensity of 60 to 90 watts of power, a beam expander, collimator and lens. The beam expander and collimator are set to produce a beam of 1.6 to 1.9 times the original crystal beam. The Q switch, which produces on the order of 2000 pulses per second, contains the beam between two mirrors, one of which is totally reflective, and one of which is 90% reflective. The lens directs the beam and concentrates it to a focal point directed at the marking point, where the beam width is between 0.005 and 0.006 inches. The depth of the etched line is determined by the beam width, the power of the beam, and the relative speed of movement of the bead and beam. The frequency of the pulsed beam plays an important part in the quality of the engraving, and should be close to 2000 pulses per second. It is the particular combination of these four factors that results in the successful marking or engraving of the specular hematite.

Preferably, pigment of some color different from the hematite is introduced to the channel that the etching process has produced, to provide a clear contrast of the etched line with the hematite to make any writing produced by the etching stand out clearly.

Numerous variations in the method of this invention within the scope of the appended claims will occur to those skilled in the art in the light of the foregoing disclosure. Merely by way of example, while the Nd:YAG type laser is the preferred type, because it has proven to produce the desired results, a different type of pulsed laser can be used if it can be pulsed at about 2000 pulses per second, and produces the power and beam width specified. This is merely illustrative.

Having thus described the invention, what is claimed and desired to be secured by letters patent is:

1. The process of engraving a channel in a specular hematite bead comprising, focusing on said bead a pulsed laser beam with a beam width of 0.005 to 0.006 inches, a wave length of about 1064 nm at an intensity of 60 to 90 watts of power and a pulse rate on the order of 2000 pulses per second, and moving said beam in a controlled pattern.

2. The process of claim 1 wherein the beam is moved on the order of 1.0 to 1.5 inches per second.

3. The process of claim 1 including the additional step of introducing into the channel a substance of different color from the hematite.

4. The process of claim 1 wherein the beam is produced by a Q-switched Nd:YAG laser.

* * * * *